United States Patent Office 3,491,198
Patented Jan. 20, 1970

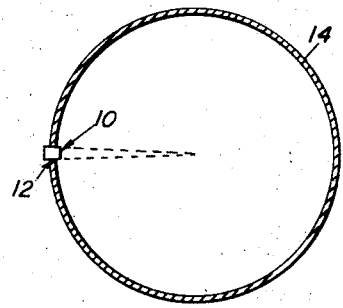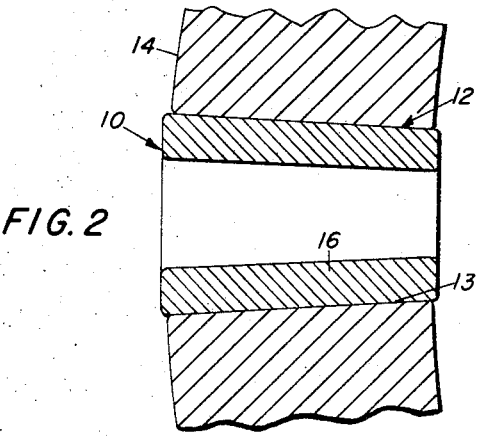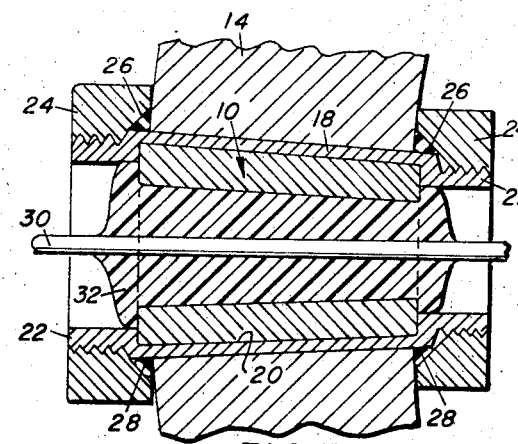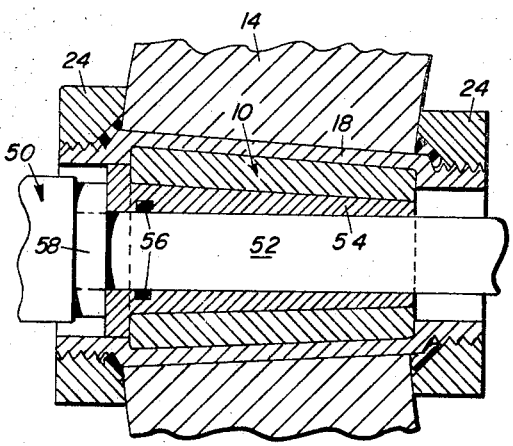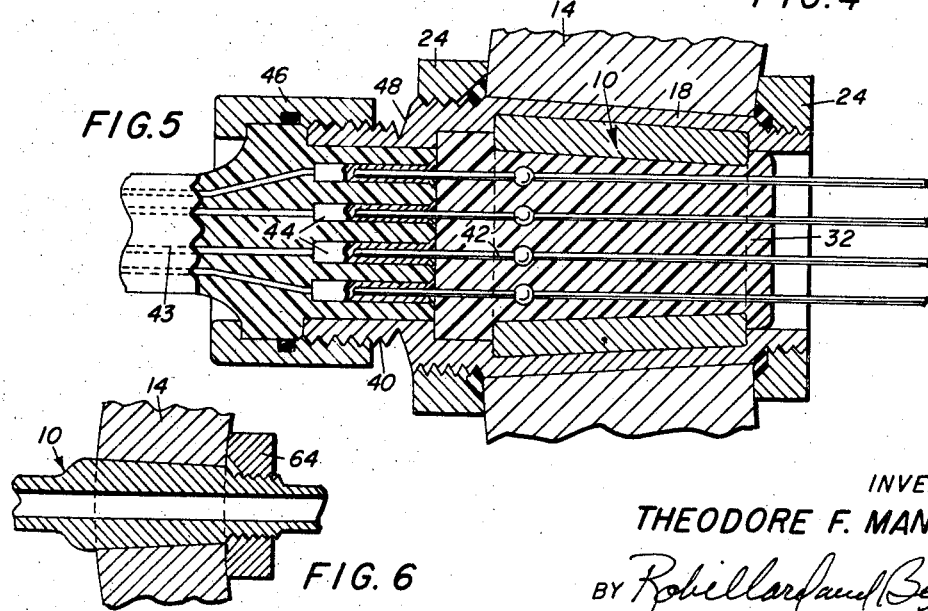

---

3,491,198
PRESSURE VESSEL WALL PENETRATOR
Theodore F. Mangels, Costa Mesa, Calif., assignor to Ocean Science & Engineering, Inc., Washington, D.C., a corporation of Delaware
Filed Jan. 24, 1968, Ser. No. 700,255
Int. Cl. H01b *17/26*
U.S. Cl. 174—152    6 Claims

ABSTRACT OF THE DISCLOSURE

A wall penetrator for watertight installation in an opening in a curved hull portion of a submersible vessel. The walls of the opening are defined by lines which approximately intersect the point of origin of the radius of curvature of the hull portion an a bored plug, which has an outer surface mating with the walls of the opening and which is made of a material having a higher modulus of elasticity in compression and a higher yield strength in compression than the material which makes up the hull, provides a means for passage through the hull for electrical connections, control rods, or the like while maintaining uniform stress distribution therein when the vessel is subjected to external pressurization.

---

This invention relates generally to a wall penetrator for a pressure vessel and more particularly relates to a wall penetrator which will allow an opening to be provided in a pressure vessel without a concomitant stress increase in the shell of the vessel.

With the advent of deep sea research with pressure vessels, it has been known that the use of vessels having curved hulls and in particular those vehicles employing spherical hulls best withstand the tremendous pressures of submersion. The emphatic need for efficient stress distribution in the vessel shell has not been fully satisfied, however, because of the necessity of interrupting the continuity of the hull with passageways for piping control rods, and electrical conductors. When an opening is formed in an externally pressurized shell, the shell is deprived of its structural integrity whereby its uniform distribution of stress is prevented and increased areas of stress, in the hull portion surrounding the opening, are created. The most commonly used method of offsetting this non-uniform distribution stress pattern is to increase the thickness of the shell material surrounding the hole for several diameters thereof. Although such a construction has been adequate for some purposes, it is a time-consuming task which limits the ability to add openings once the hull has been fabricated. It is a primary object of the instant invention to provide a means for incorporating passageways in the shell of a fabricated pressure vessel without destroying its uniform stress distribution characteristics.

An important object of the invention is to provide a plug of particular shape and material for sealing engagement in a hole bored in the shell of a pressure vessel such that there is no increase in stress in the shell portion adjacent the hole.

A further object of the invention is to provide, in a pressure vessel shell, a tapered plug having a longitudinal axis which intersects the origin for the radius of curvature of the shell portion surrounding the plug.

A yet further object of the invention is to provide, in a pressure vessel shell, a tapered plug having a central longitudinal bore and comprised of a material having both a higher modulus of elasticity in compression and a higher yield strength in compression than the pressure vessel wall.

These and other objects of the invention will become more apparent to those skilled in the art by reference to the following detailed description when viewed in light of the accompanying drawings, wherein:

FIGURE 1 is a cross sectional view of a hull provided with a wall penetrator;

FIGURE 2 is a detailed cross sectional view of the wall penetrator in place;

FIGURE 3 is a detailed cross sectional view of a modified form of the wall penetrator;

FIGURE 4 is a detailed view of the wall penetrator shown in FIGURE 2 and adapted for use with a control rod;

FIGURE 5 is a detailed cross sectional view of another modification of the wall penetrator; and FIGURE 6 is a detailed cross sectional view of a further modification of the wall penetrator.

Referring now to the drawings, wherein like numerals indicate like parts, the numeral 10 indicates in general a pressure wall penetrator or plug which is shown emplaced within an opening 12 of a pressure vessel shell 14. The opening 12 has walls 13 which are matingly engaged with the plug 10 and which are tapered inwardly as defined by radii of curvature of the hull 14. For example, when the opening 12 is circular, the plug is shaped as a frustrum of a right circular cone whose vertex substantially coincides with the center point for the radius of curvature for the associated hull portion. In order to reinforce the hull and still provide access to its interior, the plug 10 is made of a material which has both a higher modulus of elasticity in compression and a higher yield strength in compression than the material comprising the hull. A longitudinal bore 16 is provided in the plug 10 in order that necessary electrical conductors, piping, or control rods can pass through the hull without proscribing the rendition of required support by the plug. With the provision of the plug 10, the stress distribution pattern in the hull remains uniform and as if the opening 12 were non-existent.

The basic concept which leads to the above result is best understood with reference to the following example. When a cylindrical tapered plug is cut and removed from a sphere and then replaced so that its outer surface is in intimate contact with the walls of the hole from whence it came, the stress distribution in the shell when externally pressurized, will be generally the same as though no hole had ever been made. The stress distribution will likewise be unchanged if the aforementioned plug is replaced by a new plug 10 having an axial passageway 16 therein, but which is comprised of a material which has a higher modulus of elasticity and compression strength than the material of the shell 14.

Although the plug 10 can be friction fitted to the shell 14, another embodiment is shown in FIGURE 3 wherein the plug 10 is in spaced relation with the walls 13 of the opening 12 in order to accommodate a hollow collar or casing 18. This casing has an interior centrally located annular recess 20 which snugly engages the outer surface of the plug 10 and is preferably bonded thereto. The casing 18 has threaded ends 22 which are engaged by locking nuts 24 provided with beveled shoulder 26 for compressing a seal such as O ring 28 against the juncture of the hull 14 and the collar 18. An electrical conductor 30 passes through the plug bore 16 and is supported by an insulating material 32 such as epoxy molding compound which has suitable characteristics for providing a watertight seal at high pressure. An example of such an epoxy compound, made of epoxy resin, glass or asbestos fibers and various fillers, is Ciba Araldite produced by Ciba Products Co. of Summit, N.J.

FIGURE 4 shows the hull penetrator assembly of FIGURE 3 adapted for use with a control rod 50 having a rotatable shaft 52 and an enlarged portion. The shaft is received in a seal housing 54 which is bonded to both the casing 18 and the plug 10. The interior of the housing 54 is provided with a ring seal 56 which bears against the shaft 52. Thrust bearings 58 are provided between the enlarged portion and the housing 54. The combination described maintains the desired uniform stress distribution in the hull 12 while allowing leakproof rotation of the rod 50 in order to control a function outside the pressure vessel.

FIGURE 5 shows a modification similar to that of FIGURE 3 but wherein the penetrator assembly is utilized to provide an electrical connector in the hull. The collar 18 has an externally threaded extension or fitting 40 of reduced diameter projecting outwardly from the end portion 22. The insulating material 32 sealing supports a plurality of electrical connector pins 42 within the plug 10 so that their free ends project within the extension 40. In this way, a molded neoprene female connector 43 having sockets 44 for receipt of the pins 42 is received within the extension 40 and locked in place by a nut 46. An exterior annular groove 48 is provided at the base of the extension 40 so that if the extension receives a heavy blow, the groove-weakened structure will break away without diminishing the leakage resistance or structural integrity of the rest of the penetrator assembly.

FIGURE 6 shows another modification wherein the plug 10 is adapted to function as a pipe for the passage of fluid for power control. As shown, the pipe has a greater length than the thickness of the hull and is provided with a threaded inner portion for receipt of a locking nut 64 in order to prevent accidental dislodgment of the pipe. Both ends of the plug may be provided with suitable fluid-tight connections common to the hydraulics art so that fluid intake and output may be utilized.

I claim:

1. A submersible vessel comprising a hull portion of a particular radius of curvature and having an opening therein, the walls of said opening being defined by lines which intersect said radius of curvature at its point of origin, a plug for water-tight installation in said opening having a peripheral surface in mating engagement with the walls of said opening and made of a material having a higher modulus of elasticity in compression and a higher yield strength in compression than the material which comprises said hull, a pasageway through said plug permitting the entry of cables into the interior of said hull, sealing means creating a watertight connection between said cables and said passageway.

2. The invention as described in claim 1 wherein said walls and said plug have the surface characteristics of a frustrum of a right circular cone whose axis intersects the point of origin of said radius of curvature.

3. The invention as described in claim 2 wherein said plug includes end portions extending outwardly from each side of said hull, and means received on said end portions for locking and sealing said plug to said hull.

4. The invention as described in claim 1 wherein said plug includes end portions extending outwardly from each side of said hull, and means received on said end portions for locking and sealing said plug to said hull.

5. A submersible vessel comprising a hull portion of a particular radius of curvature and having an opening therein, the walls of said opening being defined by lines which intersect said radius of curvature at its point of origin, a sleeve having an outer surface portion for mating with the walls of said opening, said sleeve having end portions projecting from the inner and outer sides of said hull, means received on said end portions for locking and sealing said sleeve to said hull, a plug securely received in said sleeve, said plug having a bore therethrough and being made of a material having both a higher modulus of elasticity in compression and a higher yield strength in compression than the material which comprises said hull, and means sealing said bore.

6. The invention as described in claim 5 wherein said sleeve includes a fitting on at least one of said end portions and extending outwardly therefrom, said fitting being structurally weakened adjacent said end portion.

References Cited

UNITED STATES PATENTS

| | | | |
|---|---|---|---|
| 1,956,869 | 5/1934 | Lipman | 174—152 |
| 2,964,437 | 12/1960 | Appleton et al. | 285—158 |
| 3,352,989 | 11/1967 | Leonardis. | |
| 2,651,672 | 9/1953 | Ivanoff | 174—152 |

LARAMIE E. ASKIN, Primary Examiner

U.S. Cl. X.R.

339—130